(12) United States Patent
Bender

(10) Patent No.: US 11,174,367 B2
(45) Date of Patent: *Nov. 16, 2021

(54) CARBON BLACK PELLETS BOUND BY FUNCTIONAL POLYMER

(71) Applicant: Bridgestone Bandag, LLC, Muscatine, IA (US)

(72) Inventor: David L. Bender, Muscatine, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,474

(22) Filed: Feb. 19, 2020

(65) Prior Publication Data

US 2020/0181357 A1 Jun. 11, 2020

Related U.S. Application Data

(62) Division of application No. 15/512,613, filed as application No. PCT/US2015/051373 on Sep. 22, 2015, now Pat. No. 10,604,635.

(60) Provisional application No. 62/054,157, filed on Sep. 23, 2014.

(51) Int. Cl.
| | |
|---|---|
| *B32B 5/16* | (2006.01) |
| *C08K 3/04* | (2006.01) |
| *C09C 1/58* | (2006.01) |
| *C09C 1/56* | (2006.01) |
| *B60C 1/00* | (2006.01) |

(52) U.S. Cl.
CPC .................. *C08K 3/04* (2013.01); *B60C 1/00* (2013.01); *B60C 1/0016* (2013.01); *C09C 1/56* (2013.01); *C09C 1/58* (2013.01); *C01P 2004/50* (2013.01); *C01P 2004/61* (2013.01); *C01P 2006/22* (2013.01); *C01P 2006/33* (2013.01); *C08K 2201/005* (2013.01)

(58) Field of Classification Search
CPC .... C09C 1/58; C09C 3/10; C08K 3/04; C08K 9/08

See application file for complete search history.

(56) References Cited

U.S. PATENT DOCUMENTS

| | | |
|---|---|---|
| 2,457,962 A | 1/1949 | Whaley |
| 2,850,403 A | 9/1958 | Day |
| 3,004,940 A | 10/1961 | King |
| 3,471,439 A | 10/1969 | Bixler |
| 3,844,809 A | 10/1974 | Murray |
| 4,025,596 A | 5/1977 | Parks et al. |
| 4,440,807 A | 4/1984 | Gunnell |
| 4,569,834 A * | 2/1986 | West ........................ C08K 3/04 23/314 |

(Continued)

FOREIGN PATENT DOCUMENTS

| | | |
|---|---|---|
| CA | 2209935 A1 | 7/1996 |
| GB | 1423483 A | 2/1976 |
| WO | 2016048997 A1 | 3/2016 |

OTHER PUBLICATIONS

Nagomaya et al., "The effect of functional groups of carbon black on rubber properties", Procedia Engineering 152 (2016) 563-569 (Year: 2016).*

*Primary Examiner* — Hoa (Holly) Le

(57) ABSTRACT

A carbon black pellet comprising a plurality of agglomerates, aggregates, or primary carbon black particles and a binder including a functional polymer.

15 Claims, 1 Drawing Sheet

(56) References Cited

U.S. PATENT DOCUMENTS

| | | | |
|---|---|---|---|
| 5,168,012 A | * | 12/1992 | Watson ................ C08J 3/226 |
| | | | 423/445 R |
| 5,654,357 A | | 8/1997 | Menashi et al. |
| 5,872,177 A | | 2/1999 | Whitehouse |
| 6,479,571 B1 | | 11/2002 | Cooke et al. |
| 6,803,026 B1 | | 10/2004 | Linde et al. |
| 7,651,772 B2 | | 1/2010 | Lee |
| 8,586,651 B2 | | 11/2013 | Wang et al. |
| 10,221,293 B2 | * | 3/2019 | Bender ................ C08F 236/10 |
| 2002/0111413 A1 | | 8/2002 | Lopez-Serrano |
| 2003/0144380 A1 | * | 7/2003 | Clark ................... C09C 1/58 |
| | | | 523/205 |
| 2004/0044157 A1 | | 3/2004 | Halasa et al. |
| 2004/0048972 A1 | | 3/2004 | Halasa et al. |
| 2006/0047055 A1 | | 3/2006 | Agostini |
| 2008/0182107 A1 | * | 7/2008 | Lee ..................... C08K 9/10 |
| | | | 428/408 |
| 2010/0143585 A1 | | 6/2010 | Lee |
| 2012/0292794 A1 | | 11/2012 | Prabhu et al. |
| 2017/0306125 A1 | | 10/2017 | Bender |

\* cited by examiner

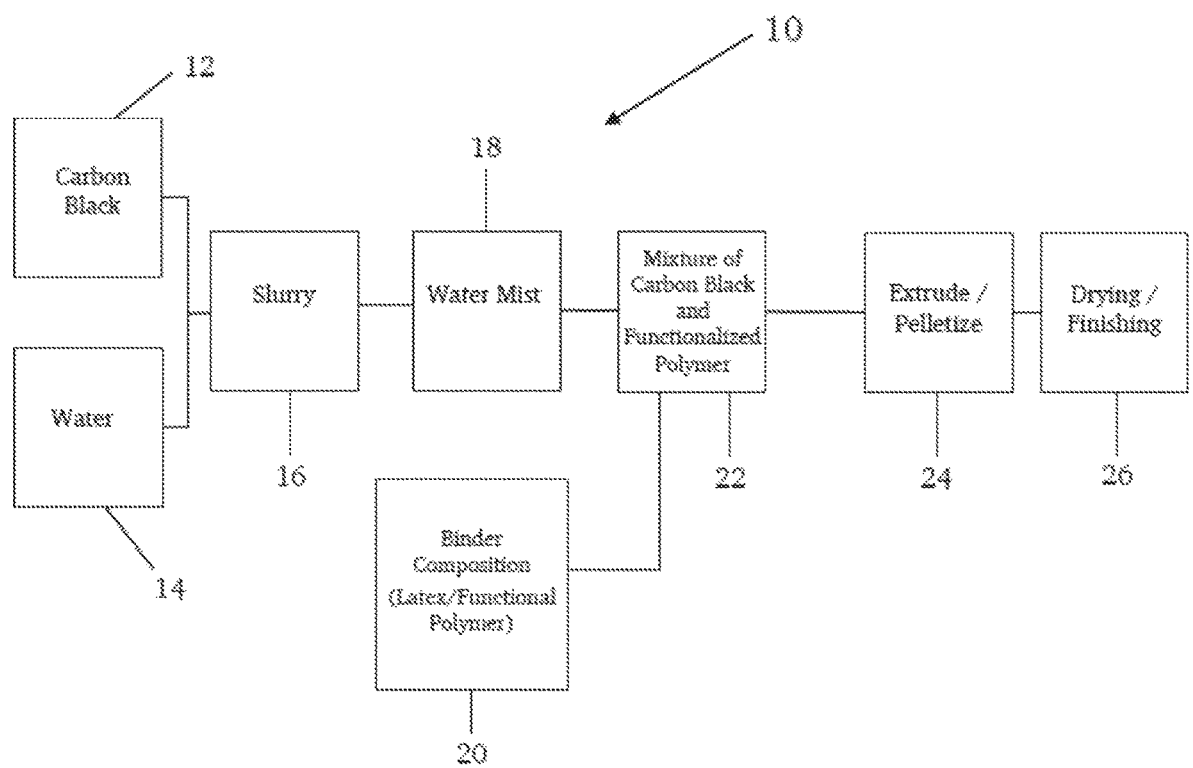

CARBON BLACK PELLETS BOUND BY FUNCTIONAL POLYMER

This application is a Divisional application of U.S. Ser. No. 15/512,613 filed on Mar. 20, 2017, which is a National-Stage application of PCT/US2015/051373 filed on Sep. 22, 2015, which claims the benefit of U.S. Provisional Application Ser. No. 62/054,157 filed on Sep. 23, 2014, which are incorporated herein by reference.

FIELD OF THE INVENTION

Embodiments of the present invention are directed toward carbon black pellets bound by functional polymer and methods for producing the same by using functional polymer latexes.

BACKGROUND OF THE INVENTION

The incorporation of fillers in the manufacture of rubber and plastic products is well-known in the industry. For example, the incorporation of carbon black in tire treads is widely used for improving wear characteristics. Elsewhere, colorants are incorporated into polyvinyl chloride and clays are incorporated into polymer composites.

In some instances, it is desirable to treat these fillers with agents, or binders, to impart further benefits. For example, these binders can reduce the generation of airborne filler dust and can also provide easier conveyance of the filler material. This treatment can also impart different surface characteristic to the binder to allow ease of dispersion into other media or to enhance or reduce interactions between components.

U.S. Pat. No. 2,850,403 discloses the use of carbohydrates (e.g. sugar, molasses, soluble starches, saccharides and lignin derivatives) as pellet binders. Likewise, U.S. Pat. No. 3,844,809 discloses the reduction in pellet dust levels partially through the use of molasses as a co-binder. These binders can form beads or pellets with the filler (such as carbon black).

Another conventional method for reducing the generation of airborne filler dust is mixing the carbon black with a latex. One example of this is U.S. Pat. No. 2,457,962, which discloses methods of beading carbon black with a latex as a wetting agent to improve the handling properties of the carbon black and dispersion of the carbon black in rubber. In one method disclosed therein, carbon black beads are formed by wetting the carbon black with latex and then agitating the mixture in a conventional carbon black pelletizer. The '962 patent discloses that the rubber content of the latex beaded carbon black should range from 5% to 20% by weight of the beaded carbon black.

In another example where a latex was utilized, U.S. Pat. No. 5,168,012 discloses carbon black beads made by a process generally including the steps of adding a latex comprising an elastomer to a carbon black filler and beading the carbon black powder and the latex in a carbon black beading apparatus. There, the latex is added to the carbon black in an amount sufficient to form beaded carbon black and the latex comprises the elastomer in an amount between 0.5% and 5% by weight of the beaded carbon black. The individual aggregates of carbon black particles become associated with latex and the elastomer is distributed substantially throughout the resulting beaded carbon black. The latex-treated carbon black beads are then preferably dried at a temperature sufficiently low to prevent decomposition or gelling of the elastomer.

Another example of using a latex is U.S. Pat. No. 8,586,651, where a method of producing an elastomer composite is disclosed. The method therein generally discloses the steps of combining a first fluid comprising elastomer latex with a second fluid comprising particulate filler; causing the elastomer latex to coagulate, thereby forming masterbatch crumb; bringing the masterbatch crumb to a desired water content, thereby forming a dewatered coagulum; removing water from the dewatered coagulum by subjecting the dewatered coagulum to mechanical energy, thereby causing the dewatered coagulum to heat as a result of friction, while allowing the dewatered coagulum to achieve a desired temperature and water content percentage, thereby producing a masticated masterbatch; and subjecting the masticated masterbatch to additional mechanical energy while further reducing the water content.

SUMMARY OF THE INVENTION

Embodiments of the present invention provide a carbon black pellet comprising a plurality of agglomerates, aggregates, or primary carbon black particles and a binder including a functional polymer.

Still other embodiments of the present invention provide a process for making a carbon black pellet, the process comprising introducing carbon black to a latex containing a functional polymer to form a mixture and densifying the mixture to form a pellet.

BRIEF DESCRIPTION OF THE DRAWINGS

The FIGURE is a schematic that provides a general overview of a process for making a pellet according to one or more embodiments of the present invention.

DETAILED DESCRIPTION OF ILLUSTRATIVE EMBODIMENTS

Embodiments of the present invention are based, at least in part, on the discovery of carbon black pellets bound with functional polymer. These pellets can advantageously be prepared by using functional polymer latexes. It is not only contemplated that these pellets will exhibit the advantages associated with the prior art pellets, such as improved dust control and more efficient dispersion into a rubber compound, but it is also contemplated that these pellets will provide rubber composites with improved interaction between the carbon black and the polymer network, especially where the network contains other functional polymer. As a result, embodiments of the invention are also directed toward tire components, such as treads and sidewalls, prepared by using the carbon black pellets of this invention.

Pellet Characteristics

In one or more embodiments, the carbon black pellets of this invention generally include a plurality of carbon black aggregates or agglomerates, as well as primary carbon black particles, bound to each other by a polymeric binder. As the skilled person understands, carbon black agglomerates include primary carbon black particles held together by various forces of attraction. Aggregates include primary carbon black particles and aggregates held together by chemical bonds, and they often represent the smallest dispersible carbon unit. Particles, which may be referred to as primary carbon black particles, are the smallest carbon unit and may be referred to as carbon black spheres. According to aspects of this invention, the polymeric binder includes a functional polymer, which will be described in greater detail below.

Pellet Size

In one or more embodiments, the pellets of this invention may be characterized by an average particle size, represented as an average particle diameter, of from about 125 to about 2250 microns.

Concentration of Binder

In one or more embodiments, the pellets of the present invention may be characterized based upon the binder content of the pellet. In one or more embodiments, the pellets include from about 1 to about 35, in other embodiments from about 2.5 to about 30, and in other embodiments from about 5 to about 25 weight percent binder based upon the total weight of the pellet, with the balance being carbon black. In one or more embodiments, the relative concentrations of binder and carbon black are tailored to maintain the pellets as a free-flowing material.

Carbon Black Type

The carbon blacks of the present invention can include but are not limited to the commonly available, commercially produced carbon blacks used in rubber products such as N-110, N-220, N-343, N-339, N-330, N-351, N-472, N-550, N-660, N-880 and N-990 as designated by ASTM D-1765-99a, as well as various channel blacks, and conductive carbon blacks. Other carbon blacks which may be utilized include acetylene blacks. A mixture of two or more of the above blacks can be used in preparing the carbon black products of the invention.

Functional Polymer

As suggested above, the polymeric binder includes a functional polymer, which is a polymer having a functional group. The functional group, which may also be referred to as a functional substituent or functional moiety, includes a heteroatom. In one or more embodiments, the polymer is carbon based, and therefore the heteroatom may include, for example, oxygen, nitrogen, sulfur, phosphors, or the like. In one or more embodiments, the functional group includes a polar group. Examples of functional groups include hydroxyl, carbonyl, ether, ester, halide, amine, imine, amide, nitrile, and oxirane (e.g., epoxy ring) groups. Polymers that include multiple distinct functional groups can also be employed. In one or more embodiments, the functional group derives from polymerization of a functional monomer, which is a monomer that includes a functional group. Examples of functional monomer include esters of ethylenically unsaturated carboxylic acids (e.g. acrylates and methacrylates), acid-bearing monomer (e.g. acrylic and methacrylic acids), amides of ethylenically unsaturated carboxylic acids, and nitriles of ethylenically unsaturated carboxylic acids.

Examples of esters of ethylenically unsaturated carboxylic acid include alkyl (meth)acrylates and hydroxyl derivatives thereof, wherein the alkyl portion has from 1 to 10, optionally from 1 to 4 carbon atoms. For ease of description, these monomers may be referred to as acrylate monomers. Examples of ester derivatives include hydroxyethyl acrylate, hydroxyethyl methacrylate, hydroxymethyl acrylate, hydroxymethyl methacrylate, hydroxypropyl acrylate, hydroxypropyl methacrylate, 4-hydroxybutyl acrylate, ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, ethylene oxide extended derivatives of ethyleneglycol methacrylate, methylacrylate, methyl methacrylate, butyl acrylate, 2-ethylhexyl acrylate, propyl acrylate, and ethyl acrylate.

Examples of acid-bearing monomers include ethylenically unsaturated carboxylic acid monomers such as acrylic acid, methacrylic acid, fumaric acid, crotonic acid, maleic acid, itaconic acid, 2-acrylamido-2-methylbutanoic acid, and the like, and combinations of two or more such acids.

Examples of amides of ethylenically unsaturated carboxylic acid include various unsaturated amides or derivatives thereof having a total of from about 3 to about 12 carbon atoms. Examples of unsaturated amides or derivatives thereof include acrylamide, methacrylamide, N,N-methylenebisacrylamide, N-methylolacrylamide, N-methylolmethacrylamide, N-ethoxymethylacrylamide, N-butoxymethylacrylamide, N-isobutoxymethylacrylamide, N,N-dimethylacrylamide, derivatives thereof, and mixtures thereof.

Examples of nitriles of ethylenically unsaturated carboxylic acid include acrylonitrile and methacrylonitrile.

In one or more embodiments, the degree of functionality of the functional polymer may be defined based upon the number of polymeric units, which are also known as mer units, that include a functional group. In one or more embodiments, each polymeric unit (i.e. mer unit) of the polymer includes a functional unit; in other words, each mer unit derives from a functional monomer. In one or more embodiments, the functional polymer may include from 1 to about 100, in other embodiments from 20 to about 98, and in other embodiments from 35 to about 95 polymeric (i.e. mer) units deriving from the polymerization of functional monomer (i.e. monomer including a functional group).

In one or more embodiments, the functional polymer is an acrylate polymer, which refers to a polymer having an appreciable number of polymeric units deriving from esters of ethylenically unsaturated carboxylic acids. In particular embodiments, each polymeric unit derives from an acrylate monomer.

In other embodiments, the functional polymer is an acrylate copolymer, which includes polymeric units deriving from the copolymerization of acrylate monomer and at least one monomer other than acrylate monomer. Examples of comonomer that can be copolymerized with acrylate monomer include aliphatic conjugated diene monomer, acid-bearing monomer, alkenyl aromatic monomer, amides of ethylenically unsaturated carboxylic acids, and nitriles of ethylenically unsaturated carboxylic acids.

In one or more embodiments, the acrylate copolymer includes from about 1 to about 60, in other embodiments from about 2 to about 50, and in other embodiments from about 3 to about 40 percent polymeric units (i.e. mer units) deriving from comonomer, with the balance deriving from acrylate monomer.

Aliphatic conjugated diene monomers include those having from about 4 to about 8 carbon atoms or optionally from about 4 to about 6 carbon atoms. Examples of diene monomers include piperylene, isoprene, 2,3-dimethyl-1,3-butadiene, 1,3-butadiene, or mixtures thereof. Mixtures of two or more conjugated dienes may also be used.

Alkenyl aromatic monomers include compounds having from about 8 to about 12 total carbon atoms. Examples of alkenyl aromatic compounds include styrene, α-methyl styrene, p-tertiary butyl styrene, methyl vinyl toluene, p-vinyl toluene, divinyl benzene, and 3-ethyl styrene, or mixtures thereof.

In one or more embodiments, the functional polymer is a styrene-butadiene-based functional polymer, which refers to a copolymer deriving from the polymerization of aliphatic conjugated diene monomer, alkenyl aromatic monomer, and at least one functional monomer. The aliphatic conjugated diene monomer and alkenyl aromatic monomer are described above. Examples of functional monomer include acid-bearing monomer, amides of ethylenically unsaturated carboxylic acids, esters of ethylenically unsaturated carboxylic acids, and nitriles of ethylenically unsaturated carboxylic acids, which monomer are described in greater detail above.

In one or more embodiments, the styrene-butadiene-based functional polymer may include from about 1 to about 60, in other embodiments from about 2 to about 30, and in other embodiments from about 3 to about 10 percent by weight polymeric units deriving from the polymerization of alkenyl aromatic monomer (e.g., styrene). In these or other embodiments, the styrene-butadiene-based functional polymer may include from about 1 to about 95, in other embodiments from about 2 to about 70, and in other embodiments from about 3 to about 48 percent by weight polymeric units deriving from the polymerization of aliphatic conjugated diene monomer (e.g., butadiene). In one or more embodiments, the styrene-butadiene-based functional polymer may include from about 1 to about 100, in other embodiments from about 20 to about 99, and in other embodiments from about 35 to about 98 percent by weight polymeric units deriving from the polymerization of functional monomer.

In one or more embodiments, especially where the functional polymer includes mer units deriving from the polymerization of conjugated diene monomer, the functional polymer may be referred to as a crosslinked functional polymer. As used herein, the term crosslinked refers to the fact that the polymer is at least partially crosslinked as part of the polymerization process employed in synthesizing the polymer. As the skilled person will appreciate, and as will be described in greater detail herein, hot polymerization processes, which may be used to synthesize the functional polymers employed in the present invention, result in at least partially crosslinking the mer units deriving from the polymerization of diene monomer.

In one or more embodiments, the crosslinked functional polymers employed in the practice of this invention may be characterized by gel content, which refers to the weight percent of crosslinked, insoluble polymer. In one or more embodiments, the functional polymers used in the present invention may be characterized by a gel content of at least 20 weight percent, in other embodiments at least 50 weight percent, in other embodiments at least 70 weight percent, and in other embodiments at least 90 weight percent. In these or other embodiments, the gel content is from about 20 to about 99, in other embodiments from about 50 to about 95, and in other embodiments from about 70 to about 90 weight percent. Gel content is typically determined based on insoluble fractions within a solvent such as THF or toluene.

In one or more embodiments, the functional polymer may be characterized based upon its glass transition temperature. For example, in one or more embodiments, the functional polymer may be characterized by a glass transition temperature (Tg) of from about −50 to about 15, in other embodiments from about −45 to about 0, and in other embodiments from about −40 to about −15° C.

Useful functional polymers can be commercially obtained. Exemplary polymers that are commercially available include those functional polymers available under the tradenames GENFLO 3060™ and GENTAC 106 (OMNOVA Solutions, Inc).

Process for Making Functional Polymer

In one or more embodiments, the functional polymer employed in the practice of this invention may be synthesized by using known techniques for making polymers of this nature. For example, functional polymer may be synthesized by using known emulsion polymerization techniques including hot emulsion techniques wherein the polymerization is conducted at temperatures above 30, in other embodiments above 40, and in other embodiments above 45° C.

Process for Making Pellets

In one or more embodiments, the pellets of the present invention can be prepared by introducing carbon black to a latex containing the functional polymer to thereby form a mixture of carbon black and functional polymer. In one or more embodiments, the carbon black and functional polymer are at least partially suspended or dispersed within water. In one or more embodiments, the carbon black may be introduced to the latex as a slurry, wherein the carbon black is at least partially suspended or dispersed in water. The mixture can then be further processed using conventional techniques for densifying the solids within the aqueous mixture. For example, processes for densification of carbon black mixtures is disclosed in U.S. Pat. Nos. 2,283,364, 2,457,962, and 5,654,357, which are incorporated herein by reference.

An exemplary process for forming carbon black pellets according to the present invention can be described with reference to FIG. 1, where process 10 includes introducing carbon black 12 and water 14 for form slurry 16. The respective streams (12, 14) are mixed within, for example, a mixhead to produce slurry 16. Water mist 18 may optionally be further applied to the slurry. A binder composition 20, which includes functional polymer, may be introduced to slurry 16 to form a mixture 22. Mixture 22 may be further processed by further agitation and/or mixing. The mixture may then be pelletized at step 24 by using conventional techniques. For example, the pellets of the present invention can be formed by compaction techniques that employ conventional continuous pin mixers or drum driers.

Following densification, the pellets may be dried and, optionally, finished, at drier 26. The pellets may be dried by exposure to heat, microwave radiation, or infrared radiation. The drying step may include an oven or hot air source that heats the pellets and there through transfers heat to the pellets.

The process of producing a pellet containing a filler and a binder may optionally include other sub-processes. These can include the production, or processing, of the filler material (e.g. collection, isolation, purification), the preparation of the filler for the application to the binder (e.g. pellet formation (separate from the final pellet formation), pressing into flakes, extrusion into rods or cylinders (separate from the final extrusion)), the application of the binder, reacting components, and packaging the final pellets (or other final product).

Practice of the present invention is not limited by the type of emulsion, suspension, or latex so long as the emulsion or latex includes a functional polymer as described herein. Polymeric latexes including functional polymer are well known in the art and commercially available.

In one or more embodiments, the polymer latex employed to prepare the carbon black pellets of the present invention can be characterized based upon the weight percent solids in the latex. In one or more embodiments, the polymer latex may include from about 0.5 to about 50, in other embodiments from about 5 to about 35, and in other embodiments from about 15 to about 25 weight percent solids.

The polymer latex employed to prepare the pellets of the present invention may also be characterized based upon the viscosity of the latex. In one or more embodiments, the latex may have a viscosity of from about 25 to about 2500, in other embodiments from about 50 to about 1800, and in other embodiments from about 100 to about 900 cps.

INDUSTRIAL APPLICABILITY

In one or more embodiments, the pellets of the present invention can be used in the preparation of tire components. For example, these tire components may include treads, sidewalls, innerliners, bead fillers, abrasion strips, and cord plies.

Practice of the present invention does not alter the methods or techniques for preparing tires or tire components. Generally speaking, the carbon black pellets of the present invention can be mixed with one or more rubbers and vulcanizing agents to prepare a vulcanizable composition of matter. These vulcanizable compositions of matter can then be fabricated into green tire components, and a green tire can be constructed using these green tire components. After construction of the green tire, conventional vulcanization techniques can be employed to form a cured tire. Conventional techniques for preparing tires are well known in the art as described in U.S. Publ. No. 2012/0053264, which is incorporated herein by reference. These vulcanizable compositions of matter can also be employed in cured or uncured treads used in retreading tires. The retreading of tires is generally well known as described in U.S. Pat. Nos. 7,052,568, 8,025,750, and 8,603,274, which are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A carbon black pellet comprising:
(i) a plurality of carbon black agglomerates, carbon black aggregates, or primary carbon black particles; and
(ii) a binder including a functional polymer,
where the carbon black pellet has an average particle size of from about 125 to about 2250 microns, wherein the functional polymer is a copolymer deriving from the polymerization of butadiene monomer, styrene monomer, and at least one functional monomer, and wherein the copolymer includes:
(a) from about 2 to about 30 percent by weight polymeric units deriving from the polymerization of styrene,
(b) from about 2 to about 70 percent by weight polymeric units deriving from the polymerization of butadiene, and
(c) from about 20 to about 99 percent by weight polymeric units deriving from the polymerization of the at least one functional monomer.

2. The carbon black pellet of claim 1, where the binder forms a matrix in which the agglomerates, aggregates, or primary carbon black particles are dispersed.

3. The carbon black pellet of claim 2, where the carbon black pellet includes from about 1 to about 35 weight percent binder, based upon the entire weight of the carbon black pellet.

4. The carbon black pellet of claim 1, where the functional polymer is emulsion polymerized at temperatures above 40° C.

5. The carbon black pellet of claim 1, where the functional polymer includes a functional group selected from the group consisting of hydroxyl, carbonyl, ether, ester, halide, amine, imine, amide, nitrile, and oxirane groups.

6. The carbon black pellet of claim 1, where the functional polymer is an acrylate-containing copolymer.

7. The carbon black pellet of claim 1, where the functional polymer is a nitrile-containing copolymer.

8. The carbon black pellet of claim 1, where the functional polymer is a styrene-butadiene-based functional polymer including one or more functional groups.

9. A plurality of the carbon black pellets of claim 1, where the plurality of carbon black pellets are free-flowing pellets.

10. The carbon black pellet of claim 1, where the at least one functional monomer is selected from the group consisting of acid-bearing monomers, amides of ethylenically unsaturated carboxylic acids, esters of ethylenically unsaturated carboxylic acids, and nitriles of ethylenically unsaturated carboxylic acids.

11. The carbon black pellet of claim 1, where the functional polymer has a glass transition temperature of from −50 to 15° C.

12. A process for making carbon black pellets, the process comprising:
(i) introducing a plurality of carbon black agglomerates, carbon black aggregates, or primary carbon black particles to a latex containing a functional polymer, wherein the functional polymer is a copolymer deriving from the polymerization of butadiene monomer, styrene monomer, and at least one function monomer to form a mixture, wherein the copolymer includes:
a) from about 2 to about 30 percent by weight polymeric units deriving from the polymerization of styrene,
b) from about 2 to about 70 percent by weight polymeric units deriving from the polymerization of butadiene, and
c) from about 20 to about 99 percent by weight polymeric units deriving from the polymerization of the at least one functional monomer; and
(ii) densifying the mixture to form the carbon black pellets.

13. The process of claim 12, where the plurality of carbon black agglomerates, carbon black aggregates, or primary carbon black particles are introduced to the latex as a slurry.

14. A plurality of the carbon black pellets of claim 12, where the plurality of carbon black pellets are free-flowing pellets.

15. The process of claim 12, wherein the at least one functional monomer is selected from the group consisting of acid-bearing monomers, amides of ethylenically unsaturated carboxylic acids, esters of ethylenically unsaturated carboxylic acids, and nitriles of ethylenically unsaturated carboxylic acids.

* * * * *